(12) United States Patent
Polepalli

(10) Patent No.: US 10,484,891 B2
(45) Date of Patent: Nov. 19, 2019

(54) GENERATING RECOMMENDATIONS FOR ACHIEVING OPTIMAL CELLULAR CONNECTIVITY BASED ON CONNECTIVITY DETAILS AND CURRENT AND PREDICTED FUTURE EVENTS

(71) Applicant: Fortinet, Inc., Sunnyvale, CA (US)

(72) Inventor: Shashidhar Reddy Polepalli, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/853,762

(22) Filed: Dec. 23, 2017

(65) Prior Publication Data

US 2019/0200244 A1 Jun. 27, 2019

(51) Int. Cl.
  *H04W 24/02* (2009.01)
  *H04W 88/08* (2009.01)
  *G06N 20/00* (2019.01)
  *H04W 84/04* (2009.01)
  *G06F 16/24* (2019.01)

(52) U.S. Cl.
  CPC ............ *H04W 24/02* (2013.01); *G06N 20/00* (2019.01); *H04W 88/08* (2013.01); *G06F 16/24* (2019.01); *H04W 84/042* (2013.01)

(58) Field of Classification Search
  CPC ........ H04W 24/02; H04W 88/18; H04W 8/00
  See application file for complete search history.

(56) References Cited

U.S. PATENT DOCUMENTS

| | | | |
|---|---|---|---|
| 10,104,593 B2* | 10/2018 | Ho | H04W 4/14 |
| 2005/0233744 A1* | 10/2005 | Karaoguz | H04W 12/08 |
| | | | 455/432.3 |
| 2010/0008218 A1* | 1/2010 | Dumov | H04L 41/0686 |
| | | | 370/216 |
| 2017/0064591 A1* | 3/2017 | Padfield | H04W 36/0088 |
| 2017/0161614 A1* | 6/2017 | Mehta | G06N 20/00 |
| 2017/0171018 A1* | 6/2017 | Hodroj | H04L 41/082 |

* cited by examiner

Primary Examiner — Keith Ferguson
(74) Attorney, Agent, or Firm — Jaffery Watson Mendonsa & Hamilton, LLP

(57) ABSTRACT

Machine learning and data analytics based systems and methods for generating recommendations for achieving optimal cellular connectivity based on connectivity details and current and predicted future events are provided. According to one embodiment, a carrier connection status based recommendation system, receives data pertaining to past, current, and predicted connection/performance data of various wireless carriers that it can recommend for a network, real-time user reports, external parameters such as expected weather, pre-determined parameters such as planned outages, and events that may impact performance of the carriers. The system also receives data pertaining to network metrics and components in the network, including requirements and performance of connected computing devices, and based on all such data, the system uses machine learning and predictive modeling to generate one or more recommendations to achieve optimal cellular connectivity, the recommendations including switching of carriers and reconfiguration of various hardware/software components therein.

14 Claims, 12 Drawing Sheets

400 ⤵

| DATA RECEIVED 402 | TIME STAMP 404 | RECOMMENDATION 406 |
|---|---|---|
| 1. WIRELESS CARRIER A IS FACING AN OUTAGE | 1674109812 | SWITCH TO WIRELESS CARRIER B |
| 2. SPORTS MEET AT XYZ STADIUM ON 2023-02-21 6:00:00 TO 2023-02-21 9:30:00 | 1676849417 | SWITCH TO WIRELESS CARRIER B AT 2023-02-21 5:55:00, SWITCHBACK TO WIRELESS CARRIER A AT 2023-02-21 9:30:00 |
| ⋮ | ⋮ | ⋮ |
| 10. NEW FIRMWARE FOUND FOR THE MODEM | 1677641400 | UPGRADE FIRMWARE |
| 11. WIRELESS CARRIER A IS PROVIDING AN INTERNET SPEED OF 600 KBPS | 1677731408 | SWITCH TO WIRELESS CARRIER B |
| ⋮ | ⋮ | ⋮ |

FIG. 4

GENERATING RECOMMENDATIONS FOR ACHIEVING OPTIMAL CELLULAR CONNECTIVITY BASED ON CONNECTIVITY DETAILS AND CURRENT AND PREDICTED FUTURE EVENTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to the field of wireless communication systems. In particular, embodiments of the present invention relate to a machine learning and data analytics based approach, based on connectivity details and current and predicted further events, for deriving and identifying patterns of connectivity for cellular operators' Internet service in a given area for a given point in time and generating appropriate recommendations for achieving optimal cellular connectivity.

Description of the Related Art

In current era of digitization, worth of the Internet has changed from luxury to necessity. Internet connectivity has improved significantly over the last several years to provide reliable data speeds to a variety of computing devices, including, but not limited to, cellular modems, serving as a secondary/back up connection to wireline Internet services or even as the sole primary Internet service, mobile phones, tablets, laptops, smart devices, and the like. Generally, wireless carriers control elements are installed and configured to provide services pertaining to wireless communications to the computing devices. As most computing devices are configured to connect to a single wireless carrier at a given time, it becomes important for the computing devices to be connected to the wireless carrier that is providing the best quality Internet connectivity and data speed.

There are various factors that a customer, e.g., an enterprise, considers while selecting a wireless carrier for Internet services, including service availability in a geographical area, cost, download and upload speed, reliability, and the like. However, even after effectively considering such factors, the selected wireless carrier may not be able to provide a consistent uninterrupted Internet service. When an enterprise experiences an interrupted Internet connection, the network administrator must perform tedious tasks such as resetting or reconfiguring network devices, checking for temporary service interruptions, changing to a second network carrier, resetting network settings in the computing device, etc. Performing these tasks to overcome Internet connectivity interruptions consumes unnecessary time that can adversely impact the activities and business of the enterprise. Thus, if the network administrator is aware of the instant at which the wireless carrier would not be able to provide uninterrupted Internet connectivity in advance, he/she can take a suitable action to avoid experiencing degradation in the internet connectivity. Currently, there are no techniques that can predict connectivity interruptions by monitoring, among other things, connectivity details from multiple customers of wireless carriers and make appropriate recommendations.

SUMMARY

Systems and methods are described for generating recommendations for achieving optimal cellular connectivity. According to one embodiment, a carrier connection status based recommendation system, receives data pertaining to past, current, and predicted connection/performance data of various wireless carriers that it can recommend for a network, real-time user reports, external parameters such as expected weather, pre-determined parameters such as planned outages, and events that may impact performance of the carriers. The system also receives data pertaining to network metrics and components in the network, including requirements and performance of connected computing devices, and based on all such data, the system uses machine learning and predictive modeling to generate one or more recommendations to achieve optimal cellular connectivity, the recommendations including switching of carriers and reconfiguration of various hardware/software components therein.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4 illustrates an exemplary representation of a log of recommendations maintained by a user computing device or a network controller in accordance with an embodiment of the present invention.

DETAILED DESCRIPTION

Figure 1:
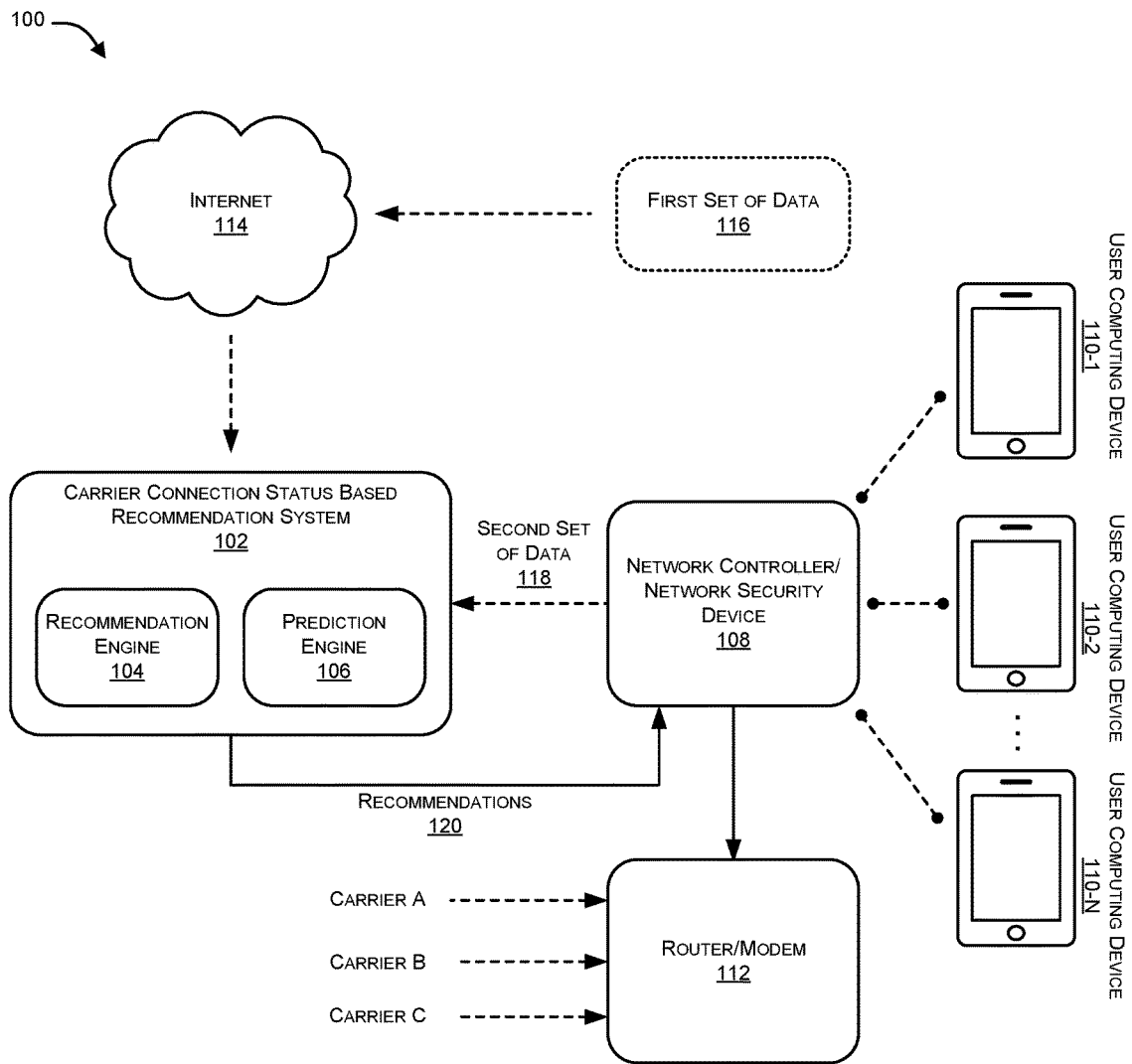
FIG. 1 illustrates exemplary network architecture in which or with which embodiments of the present invention can be implemented.

Systems and methods are described for generating recommendations for achieving optimal cellular connectivity.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Embodiments of the present invention generally relate to the field of wireless communication systems. In particular, embodiments of the present invention relate to a machine learning and data analytics based approach, based on connectivity details and current and predicted further events, for deriving and identifying patterns of connectivity for cellular operators' Internet service in a given area for a given point in time and generating appropriate recommendations for achieving optimal cellular connectivity.

In an exemplary aspect, the system of the present disclosure can include: a non-transitory storage device having embodied therein one or more routines operable to recommend at least one action to be taken based on current and predicted connection status of one or more wireless carriers; and one or more processors coupled to the non-transitory storage device and operable to execute the one or more routines, wherein the one or more routines can include: a carrier connection data receive module, which when executed by the one or more processors, can receive data pertaining to connection status of the one or more wireless carriers, at least one of the one or more wireless carriers being instantly connected to the system through a network controller, wherein the received data can be selected from any or a combination of Internet feed pertaining to current and future predicted connection status for the one or more wireless carriers, real-time user reports pertaining to the connection status for the one or more wireless carriers, past and current connection behavior of the one or more wireless carriers, performance data metrics pertaining to the one or more wireless carriers, current connection parameter values received for the instantly connected carrier from one or more user computing devices that are operatively coupled to the network controller, current and future weather conditions, future outage information received from the one or more wireless carriers, and one or more future events that may potentially impact the connection status for the one or more wireless carriers; and a carrier connection data processing based recommendation module, which when executed by the one or more processors, can process, based on machine learning, the received data pertaining to the one or more wireless carriers, and can recommend at least one action to be taken to prevent carrier connection degradation based on the processed data, the at least one action being selected from any or a combination of switching from the instantly connected wireless carrier to a second carrier selected from the one or more wireless carriers based on data pertaining to the second carrier, staying with the same instant connected carrier, switching to the second carrier for a defined time and reverting back to the instantly connected carrier, switching to a wired connection, reconfiguration of a modem/router that is coupled with the instantly connected wireless carrier, and reconfiguration of settings of the instantly connected wireless carrier.

In another aspect, the current connection parameter values received for the instantly connected carrier can be selected from any or a combination of signal strength of the connected carrier, signal quality of the connected carrier, geographical location of the one or more user computing devices, timestamp at which the current connection parameter values are transmitted, reported/experienced connectivity issues, reboots, service disruptions, software version, hardware version, and configuration settings.

In yet another aspect, the carrier connection data receive module can further receive data pertaining to any or a combination of hardware issues reported for the one or more wireless carriers, software issues reported for the one or more wireless carriers, and hardware/software issues pertaining to the network controller.

In an aspect, the processing of the received data can include deriving a correlation or pattern based on the received data so as to build a predictive model, and generate recommendation of the at least one action based on the predictive model.

In another aspect, the predictive model can be refined based on the received data, recommended actions, and feedback on change in connection status based on the recommended actions.

In yet another aspect, the carrier connection data receive module can receive a first set of data from the Internet, and a second set of data from network controller, wherein the first set of data can include the Internet feed pertaining to current and future predicted connection status for the one or more wireless carriers, the real-time user reports pertaining to the connection status for the one or more wireless carriers, the past and current connection behavior of the one or more wireless carriers, performance data metrics pertaining to the one or more wireless carriers, the current and future weather conditions, the future outage information received from the one or more wireless carriers, and the one or more future events that may potentially impact the connection status for the one or more wireless carriers. The second set of data, on the other hand, can include the current connection parameter values received for the instantly connected carrier from one or more user computing devices that are operatively coupled to the network controller.

In an aspect, the switching from the instantly connected wireless carrier to the second carrier can be enabled through activation of data connection of SIM card pertaining to the second carrier, wherein SIM cards of the instantly connected wireless carrier and the second carrier can be configured in a multi-SIM card slot based device such as in a modem or a router or in the end-user device itself, as may be desired/configured.

In another aspect, the one or more future events can include any or a combination of a crowd gathering, a party, and a festival celebration.

In yet another aspect, the network controller can be any or a combination of a gateway device, a firewall, a hub, and a network security device.

In an aspect, the at least one recommendation can be sent to any or both of the network controller or at least one of the one or more user computing devices that execute the at least one recommendation.

In another aspect, the one or more user computing devices can be selected from any or a combination of mobile phones, smart phones, laptops, desktop PCs, tablet PCs, PDAs, and wearable devices.

In another exemplary aspect, the present disclosure pertains to a method that includes the steps of: receiving, at a network device, data pertaining to connection status of one or more wireless carriers, at least one of the one or more wireless carriers being instantly connected (or capable of being connected) through a network controller (which may, in one aspect, be the network device itself, such as a gateway device, a firewall, a hub, or any other network security device), wherein the received data can be selected from any or a combination of Internet feed pertaining to current and future predicted connection status for the one or more wireless carriers, real-time user reports pertaining to the connection status for the one or more wireless carriers, past and current connection behavior of the one or more wireless carriers, performance data metrics pertaining to the one or more wireless carriers, current connection parameter values received for the instantly connected carrier from one or more user computing devices that are operatively coupled to the network controller, current and future weather conditions, future outage information received from the one or more wireless carriers, and one or more future events that may potentially impact the connection status for the one or more wireless carriers; and processing, at the network device, based on machine learning, the received data pertaining to the one or more wireless carriers, and recommending at least one action to be taken to prevent carrier connection degradation based on the processed data, the at least one action being selected from any or a combination of switching from the instantly connected wireless carrier to a second carrier selected from the one or more wireless carriers based on data pertaining to the second carrier, staying with the same instant connected carrier, switching to the second carrier for a defined time and reverting back to the instantly connected carrier, switching to a wired connection, reconfiguration of a modem or router that is coupled with the instantly connected wireless carrier, and reconfiguration of settings of the instantly connected wireless carrier.

In an aspect, system of the present disclosure essentially accesses, analyzes and learns from various data sets in a continuous manner in order to generate suitable recommendations regarding actions that can be taken by an appropriate device (for instance, a network controller/network security device/that can accordingly instruct/configure a router/modem) to prevent carrier connection degradation or improve the carrier connection.

In an exemplary embodiment, one data set can be signal strength (for instance, RSSI—relative received signal strength—which, in a wireless environment is an indication of power level being received by a wireless router for example, after possible antenna and cable losses, the higher the RSSI number, the stronger the signal), signal quality (indicated by signal to noise ratio), cellular service and type (LTE, 3G, 4G . . . ), GPS location, time of day, weather, third party reports of latency, Internet speeds and performance, disconnects from current device as well as from 3rd party websites reports (that can take the form of Internet feeds) specific to that geographical area where service is being provided, software build and hardware versions of the equipment installed. The data set can also factor in various events that can load/disrupt internet service such as sporting events, planned maintenance in the region in the near future etc. Other data sets can include internal bug reports, customer care tickets, Software versions, Hardware versions, software release notes on known issues and which software releases have the ability to resolve the issues on the field.

Various Internet feeds such as websites and servers hosting weather/climatic data, connectivity details like signal, disconnects, coverage, users reports available from websites that crowd source coverage mapping and network performance service for wireless networks (for instance http://sensorly.com), and those hosting any scheduled maintenance data and the like can be incorporated in the data sets.

As can be appreciated from above, while some aspects for different data sets can be clearly determined—for instance present signal strength—many others such as weather and its possible impact are 'fuzzy' and indeterminate, and only a predictive analysis, based on historical data can be done. Some others, for instance, customer care tickets, announcement of events etc. require natural language processing abilities for relevant data to be extracted therefrom. By continuous collection of these data sets and using machine learning tools for their analysis, system of the present disclosure aims to predict and recommend steps for a favorable outcome (that being preventing carrier connection degradation or improving the same).

Further, as more and more data sets become available, machine learning enables the proposed system to continuously fine tune itself. The system, for instance, can evaluate/determine whether the currently experienced LTE internet connectivity is good or a better alternative is available based on historical and current data sets and if there are any risks/internet disruptions anticipated (now or in the future) as a result of staying on the current internet service, and may make recommendations accordingly that can include, for example, switching to an alternate Internet service either immediately or at a time instant in the future (wherein such time can also be fine tuned based upon monitoring and analysis of events that may occur in between the instant when this decision is taken and the time instant).

In an alternate exemplary embodiment, the system of the present disclosure can analyze problems being reported by field personnel, correlate them to software/hardware versions being used (for example, that of a router) and software release notes to finally generate an automatic recommendation elaborating upon a suggested action to resolve a present/emergent issue. The suggested action can be, for example, a software upgrade/downgrade that can resolve the issue. Appropriate weights can be given to different possible actions to arrive at the most optimal recommendation. For instance, if a network connectivity problem can be solved by shifting to an alternate Internet service provider, or by a software upgrade, the proposed system can decide which of these two actions to take. Various factors such as cost of different carriers, disruption time and the like can also be factored into such decisions.

Those skilled in the art will appreciate that various scalable and robust machine learning algorithms can identify patterns in data sets as elaborated herein and develop models for making predictions and, accordingly, recommendations with the objective of providing the best possible Internet access at a given location at a given point in time that can be the present instant or a future instant. Industry standard natural language processing algorithms can be used to generate data sets. For example, the content of different industry feeds can be interpreted to derive inferences like checking an internet provider's website for outage/maintenance ongoing/future related activity.

It can be readily understood that the system as elaborated above and hereunder is highly scalable. Hence, while it has been described herein with reference to a single network controller controlling one geographic location/customer site, it can likewise be extended to thousands of geographically distributed customer sites and can receive inputs and deliver recommendations in a similar manner as elaborated herein.

FIG. 1 illustrates an exemplary network architecture 100 in which or with which embodiments of the present invention can be implemented. In the context of the present example, a carrier connection status based recommendation system 102 provides a machine learning and analytics infrastructure that makes recommendations 120 to network controller/network security device 108 on an action to be taken based on the current and predicted future events to manage a cellular internet data sessions by accessing data from internet feeds, support service tickets (e.g., relating to network controller/network security device 108 and/or router/modem 112), internal bug reports and the like. System 102 includes a recommendation engine 104 and a prediction engine 106 (described in further detail below with reference to FIG. 2), amongst other components. System 102 can be operatively connected to a network controller 108 (that can be a standalone device, part of a network security device or part of another network device). While in the context of the current example, system 102 is located within a private network, in alternative embodiments, system 102 may operate as an external service for the benefit of numerous subscribing entities.

Controller 108 is responsible for activating a cellular internet session and sending/receiving signal/performance data to/from system 102. Controller 108 may also be responsible for controlling a private network (e.g., an enterprise network) including various user computing devices 110 spread over a geographical site (or across multiple sites), and can monitor/control data traffic entering and/or leaving the network. Further, controller 108 can be connected to a router and/or a modem 112 that can provide data connectivity between the network and external environment/computing devices (for example, Internet connectivity). For example, router/modem 112 may provide a primary Internet connection or may provide a secondary Internet connection when the primary internet connection is not available, thereby representing an internet failover solution.

Modem 112 can be configured to connect to various data carriers (such as various Internet Service Providers, including wireless carriers) and switch amongst different carriers (using a multi-SIM configuration, for instance, or by reprogramming a single-SIM configuration) based upon appropriate instructions it can receive from network controller 108. Such instructions can enable configuration of modem 112 according to software/hardware settings of the carrier it needs to connect to, as instructed by controller 118. In an exemplary embodiment, modem 112 can be a cellular modem having multiple SIMs (i.e., multiple SIM card slots configured to carry multiple SIM cards at a given instance), each SIM being configured for a corresponding carrier. Modem 112 can receive instructions from the network controller 108 to switch from one SIM to another based on instructions it receives from the network controller 108.

Controller 108 can, in turn, issue such instructions based on one or more recommendations it receives from carrier connection status based recommendation system 102 (which may be referred to interchangeably herein simply as system 102). System 102 can evaluate the connection status with the carrier (that is of the data carrier) that modem 112 is presently connected to with reference to the quality of the connection (for instance, speed, signal to noise ratio, latency, network drops and the like) and in case a degradation in same has happened, or is expected in the future (such an expectation being derived from historical data or clearly determined data such as announced outages, or expected situations such as a snowstorm or a crowd-gathering due to an upcoming festival/event), can recommend an alternative carrier to the network controller 108 out of the various available based on which controller 108 can enable the modem 112 to switch carriers accordingly in order to maintain optimal Internet connectivity.

According to one embodiment, system 102 can factor in and analyze a variety of factors (referred to as "datasets" herein) to generate its recommendations. Such datasets can include data pertaining to connection status of one or more wireless carriers that system 102 has access to, illustrated as first set of data 116. System 102 can receive such data through Internet 114, wherein, in an aspect, the first set of data 116 can include, but is not limited to, Internet feeds pertaining to current and future predicted connection status for the one or more wireless carriers, real-time user reports pertaining to the connection status for the one or more wireless carriers, past and current connection behavior of the one or more wireless carriers, performance data metrics pertaining to the one or more wireless carriers, current and future weather conditions, future outage information received from the one or more wireless carriers, and one or more future events that may potentially impact the connection status for the one or more wireless carriers. Examples of datasets may include, but are not limited to websites and servers hosting weather/climatic data, connectivity details like signal, disconnects, coverage, users reports like downdetector.com, http://www.sensorly.com and ISP (internet service provider) websites which host scheduled maintenance data.

System 102 may also receive a second set of data 118 from/through network controller 108. The second set of data can include the current connection parameter values received for the instantly connected carrier from one or more user computing devices 110 that are operatively coupled to the network controller 108. The current connection parameters can be selected from any or a combination of signal strength of the connected carrier, signal quality of the connected carrier, geographical location of the one or more user computing devices, timestamp at which the current connection parameter values are transmitted, reported/experienced connectivity issues, reboots, service disruptions, software version, hardware version, and configuration settings.

System 102 can process, based on machine learning, all above data and based on such processing, can recommend at least one action to be taken to prevent carrier connection degradation. In various exemplary embodiments, the action recommended can include any or a combination of switching from the instantly (presently) connected wireless carrier to a second carrier selected from the one or more wireless carriers based on data pertaining to the second carrier, staying with the same instant connected carrier, switching to the second carrier for a defined time and reverting back to the instantly connected carrier, switching to a wired connection, reconfiguration of the modem 112, and reconfiguration of settings of the instantly connected wireless carrier.

Further, system 102 can process various data received as above to derive correlations or patterns that can enable system 102 to build a predictive model (i.e., based on historical patterns indicative of when a given carrier usually suffers outage or shows bandwidth/performance constraints). System 102 can accordingly generate recommendations of action(s) it can suggest based on this predictive model. The predictive model can be further refined based on the received data, recommended actions, and feedback on change in connection status based on the recommended actions.

In this manner, system 102 can use machine learning to generate appropriate recommendations that network controller 108 can use to configure/reconfigure modem 112 and/or carrier connected at an instant to modem 112 to provide optimum data services to various user computing devices 110 connected to the controller 108.

In an exemplary implementation, network controller 108 can determine, for instance, that all user computing devices connected at the instant to it are 3G and can pass this information to system 102. System 102 can as well receive information that present carrier connected to modem 112 is a more expensive 4G carrier, but a cheaper 3G carrier is available to the modem 112. Accordingly, system 102 can recommend to network controller 108 to switch to 3G and the controller 108 can pass instructions accordingly to modem 112 based upon which modem 112 can switch to the 3G carrier as well as reconfigure itself according to the 3G carrier settings.

In another exemplary embodiment, modem 112 may be presently using a wireless carrier (e.g., wireless carrier A) that may represent the best performance parameters such as data transmission speeds, latency, signal to noise ratio etc. among available wireless carriers. However, an Internet feed being received by system 102 may enable system 102 to predict (based, for instance, upon historical data as well as weather related information that system 102 has access to and analyzing such data using machine learning), that within the next few hours (e.g., three hours) a severe snowstorm is expected in the area that may last for a number of hours (e.g., five hours), and that during previous such instances the performance of carrier A was severely deteriorated while that of another wireless carrier (e.g., wireless carrier B) was deteriorated only marginally. Accordingly, system 102 can generate a recommendation for network controller 108 to instruct modem 112 to switch from carrier A to carrier B three hours hence, and switchback to career A five hours thereafter. Further, system 102 can continuously monitor the various parameters at all times to fine tune its recommendations. For instance, system 102 may determine from another Internet feed one hour later that the snowstorm is expected to be delayed by one hour, and therefore can delay the switchover by one hour.

In yet another exemplary embodiment, based upon pattern matching and a predictive model enabled by system 102, aberrant behavior of an outlier can readily be pinpointed. For instance, if a network component's operational parameters (for instance, a network interface of a router/modem 112 enabling it to connect to the carriers) start indicating errors above a certain threshold, system 102 can predict the component is reaching its end of life, and can generate a recommendation to replace the component at issue.

Further, system 102 can continuously monitor the impact of its recommendations after their implementation so as to determine their accuracy and further learn from such data for future recommendations. For the purpose, system 102 can receive from network controller 108 the revised connection parameter values once a recommendation provided by it to network controller 108 has been implemented and thereafter learn from such data.

For instance, a recommendation can be to shift from carrier A to carrier B at 4 PM today, based upon various factors. However, upon such a switch, system 102 may determine that while data transmission speed has not deteriorated, signal to noise ratio has deteriorated significantly. Depending upon various parameters, system 102 may recommend a switch back to carrier A, or select a third carrier, carrier C. At the same time, system 102 may factor this new input for future recommendations. For instance, before generating a recommendation for switching to carrier B next time, system 102 may run a check on its signal to noise ratio. Or system 102 may still switch to carrier B but only after determining (based, for instance, on the second set of data that it can receive through network controller 108) that no mission critical applications are running on any of the user computing devices 110.

It can be readily appreciated that recommendations can pertain to other aspects of a network besides switching of a carrier. For instance, a dataset received may indicate that new firmware version has been released by the manufacture of modem 112. Accordingly, system 102 can generate a recommendation to download and upgrade the firmware of modem 112 and network controller 108 may take actions accordingly.

In an exemplary embodiment, system 102 and network controller 108 can be configured together to constitute a network device. In another exemplary embodiment, the network device can include modem 112 as well.

In this manner, system 102 can use machine learning and predictive modeling to make recommendations regarding various actions to be taken by a network controller to prevent carrier connection degradation. Recommendations can be revised and fine tuned so as to make them more and more accurate, and so increase their efficiency, with passage of time.

Figure 2:
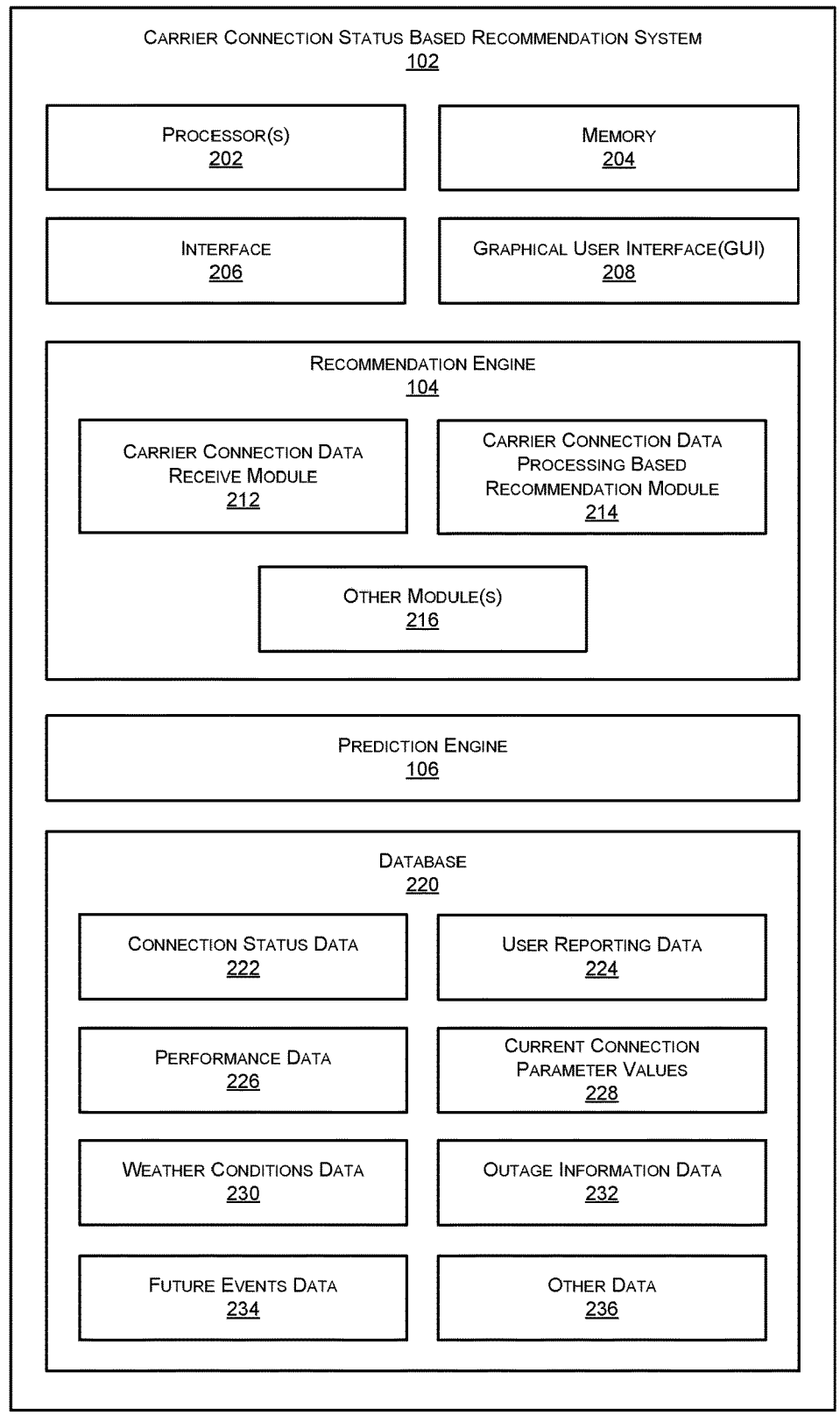
FIG. 2 illustrates an exemplary module diagram for carrier connection status based recommendation system in accordance with an embodiment of the present invention.

FIG. 2 illustrates an exemplary module diagram for a carrier connection status based recommendation system 102 in accordance with an embodiment of the present invention. In the context of the present example, system 102 can include recommendation engine 104 and prediction engine 106 as illustrated in FIG. 1 and being further elaborated herein. Besides, system 102 can include in addition various other components as shown in FIG. 2 and summarized hereunder in order to enable performance of system 102.

In an aspect, system 102 may include one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204 of system 102. Memory 204 may store one or more computer-readable instructions or routines, which may be fetched and executed to create or share the data units over a network service. Memory 204 may include any non-transitory storage device including, for example, volatile memory such as RAM, or non-volatile memory such as EPROM, flash memory, and the like.

System 102 may also include interface(s) 206. The interface(s) 206 may include a variety of interfaces, for example, interfaces for data input and output devices, referred to as I/O devices (for example keyboard, mouse and the like), storage devices, and the like. Interface(s) 206 may facilitate communication of system 102 with various devices coupled to system 102. Interface(s) 206 may also provide a communication pathway for one or more components of system 102. Examples of such components include, but are not limited to, prediction engine 106 and database 220.

System 102 can also include a graphical user interface (GUI) 208. GUI 208 can enable a user and/or administrator of system 102 to receive visual inputs as well as provide his/her own inputs via interfaces 206.

Database 220 may include data that is either received and thereby stored for further use by system 102, or generated as a result of functionalities implemented by any of the components of the proposed system. In an exemplary embodiment, as shown, database 220 can store connection status data 222, user reporting data 224, performance data 226, current connection parameter values 228, weather conditions data 230, outage information data 232, future events data 234 and others data 236. As elaborated further, these data can be accessed by various modules and engines of the proposed system as and when required.

Recommendation engine 104 can include a carrier connection data receive module 212 and a carrier connection data processing based recommendation module 214 as elaborated further hereunder.

In an aspect, carrier connection data receive module 212 can be configured to receive data pertaining to connection status of the one or more wireless carriers, in which at least one of the one or more wireless carriers is currently being used by the private network at issue as a primary or a secondary Internet connection. The received data can be selected from any or a combination of one or more Internet feeds pertaining to current and future predicted connection status for the one or more wireless carriers, real-time user/subscriber reports pertaining to the connection status for the one or more wireless carriers, past and current connection behavior of the one or more wireless carriers, performance data metrics pertaining to the one or more wireless carriers, current connection parameter values received for the instantly connected carrier from one or more user computing devices that are operatively coupled to the network controller, current and future weather conditions, future outage information received from the one or more wireless carriers, and one or more future events that may potentially impact the connection status for the one or more wireless carriers.

For instance, the geographical site being controlled by the network controller may be expected to have a severe thunderstorm within two hours and lasting for the next three hours. A wireless carrier may have declared a scheduled downtime for maintenance via its website. Real-time user reports for another carrier may be indicating high signal drop rates. There may be a sporting event planned in the locality that may increase significantly the number of mobile devices connected to the network (such devices belonging to spectators) and expected to result in increased data congestion. All such data can be received by module 212 for further use by the proposed system, as elaborated further.

In another aspect, the current connection parameter values received for the instantly connected carrier can be selected from any or a combination of signal strength of the connected carrier, signal quality of the connected carrier, geographical location of the one or more user computing devices, timestamp at which the current connection parameter values are transmitted, reported/experienced connectivity issues, reboots, service disruptions, software version, hardware version, and configuration settings.

For instance, the current carrier connected to the network (through network controller 108 and modem 112, as elaborated in FIG. 1) can have a signal strength intermittently dropping below a certain threshold value with a low signal to noise ratio, with presently most user computing devices in the area being widely dispersed but expected to congregate at its centre sometime later when an event (for instance a sporting event at a nearby stadium) begins.

In yet another aspect, module 212 can further receive data pertaining to any or a combination of hardware issues reported for the one or more wireless carriers, software issues reported for the one or more wireless carriers, and hardware/software issues pertaining to the network controller. For instance, a firmware upgrade may have been released for the network controller. After a new operating system update, some user computing devices may have stopped receiving wireless data and may need a new patch from one or more wireless carriers.

In an aspect, the carrier connection data receive module 212 can receive a first set of data from the Internet that can include an Internet feed pertaining to current and future predicted connection status for the one or more wireless carriers, the real-time user reports pertaining to the connection status for the one or more wireless carriers, the past and current connection behavior of the one or more wireless carriers, performance data metrics pertaining to the one or more wireless carriers, the current and future weather conditions, the future outage information received from the one or more wireless carriers, and the one or more future events that may potentially impact the connection status for the one or more wireless carriers.

In another aspect, module 212 can receive a second set of data from the network controller that can include the current connection parameter values received for the instantly connected carrier from one or more user computing devices that are operatively coupled to the network controller.

In another aspect, the one or more future events can include any or a combination of a crowd gathering, a party, and a festival celebration. As elaborated, such future events have a bearing on carrier performance expected. For instance, if user computing devices are expected to increase substantially in the near term for a determined duration, it will be desirable to have data connection via a wireless carrier having a throughput rate/bandwidth.

In yet another aspect, the network controller can be any or a combination of a gateway device, a firewall, a hub, and a network security device, while the one or more user computing devices can be selected from any or a combination of mobile phones, smart phones, laptops, desktop PCs, tablet PCs, PDAs, and wearable devices.

In an aspect, module 214 can process, based on machine learning, the received data pertaining to the one or more wireless carriers, and recommend actions to be taken to prevent carrier connection degradation based on the processed data.

In another aspect, the actions to be taken can be selected from any or a combination of switching from the instantly (that is, presently) connected wireless carrier to a second carrier selected from the one or more wireless carriers based on data pertaining to the second carrier, staying with the same instant connected carrier, switching to the second carrier for a defined time and reverting back to the instantly connected carrier, switching to a wired connection, reconfiguration of a modem that is coupled with the instantly connected wireless carrier, and reconfiguration of settings of the instantly connected wireless carrier.

For instance, a wireless carrier A presently serving the network may have indicated a scheduled downtime on its website. Module 212 can access this information via an Internet feed and provide the same to module 214. Module 214 can accordingly recommend that at such scheduled downtime, the network controller may switch from wireless carrier A to a wired connection B that is expected to be working for the duration.

In an aspect, switching from the instantly connected wireless carrier to the second carrier can be enabled through activation of data connection of SIM card pertaining to the second carrier, wherein SIM cards of the instantly connected wireless carrier and the second carrier can be configured in a multi-SIM card slot based device.

For instance, a modem (such as modem 112) providing data to the network through a network controller (such as controller 108) can be a multiple SIM device, each SIM configured for a corresponding carrier and it can receive instructions from network controller 108 to switch from one SIM to another, based upon instructions it can receive from network controller 108. Module 214 can generate a recommendation based upon which controller 108 can issue the necessary instructions to modem 112.

In another aspect, the recommendations can be sent to any or both of the network controller or the user computing devices that can then execute the recommendations. For instance, module 214 may determine that due to weather disturbances (a dataset that module 214 can receive from module 212), Internet services over the next one hour may have intermittent disruptions, irrespective of the wireless carrier used. In such circumstances, module 214 can generate a recommendation for the user computing devices not to run any mission critical applications. An appropriate message may be displayed on to any user computing device that attempts the same.

In another aspect, system 102 can further include a prediction engine. Prediction engine 106 can derive a correlation or pattern based on the received data so as to build a predictive model, process the received data, and generate a recommendation regarding at least one action based on the predictive model. As those skilled in the art will appreciate, there are scalable and robust industry standard machine learning algorithms that are capable of identifying patterns in the datasets described herein and that will facilitate construction of the predictive models used herein for making predictions. These models can be utilized to make recommendations for making the best possible Internet access availability, for example, for a given geographical location for a given point in time or in future. Also, industry standard natural language processing algorithms can be used to interpret the content of the internet feeds to derive inferences like checking an internet provider's website for outage/maintenance ongoing/future related activity.

In yet another aspect, prediction engine 106 can refine the predictive model based on the received data, recommended actions, and feedback on change in connection status based on the recommended actions.

In an exemplary embodiment, based upon such predictive analysis, system 102 can determine, for example, when modem 112 is nearing is failure point and can generate a recommendation to replace it (that the network controller 108 can handle by raising an appropriate alert for the system administrator, for example) so that modem 112 is replaced before such failure actually occurs, thereby preventing a severe service outage or leaving the enterprise without a secondary Internet connection. In a similar manner, data traffic to and from different nodes (such as network controller 108, user computing devices 110 and even system 102 of the present disclosure itself for instance) can be continuously monitored and appropriate predictive maintenance actions taken.

Figure 3:
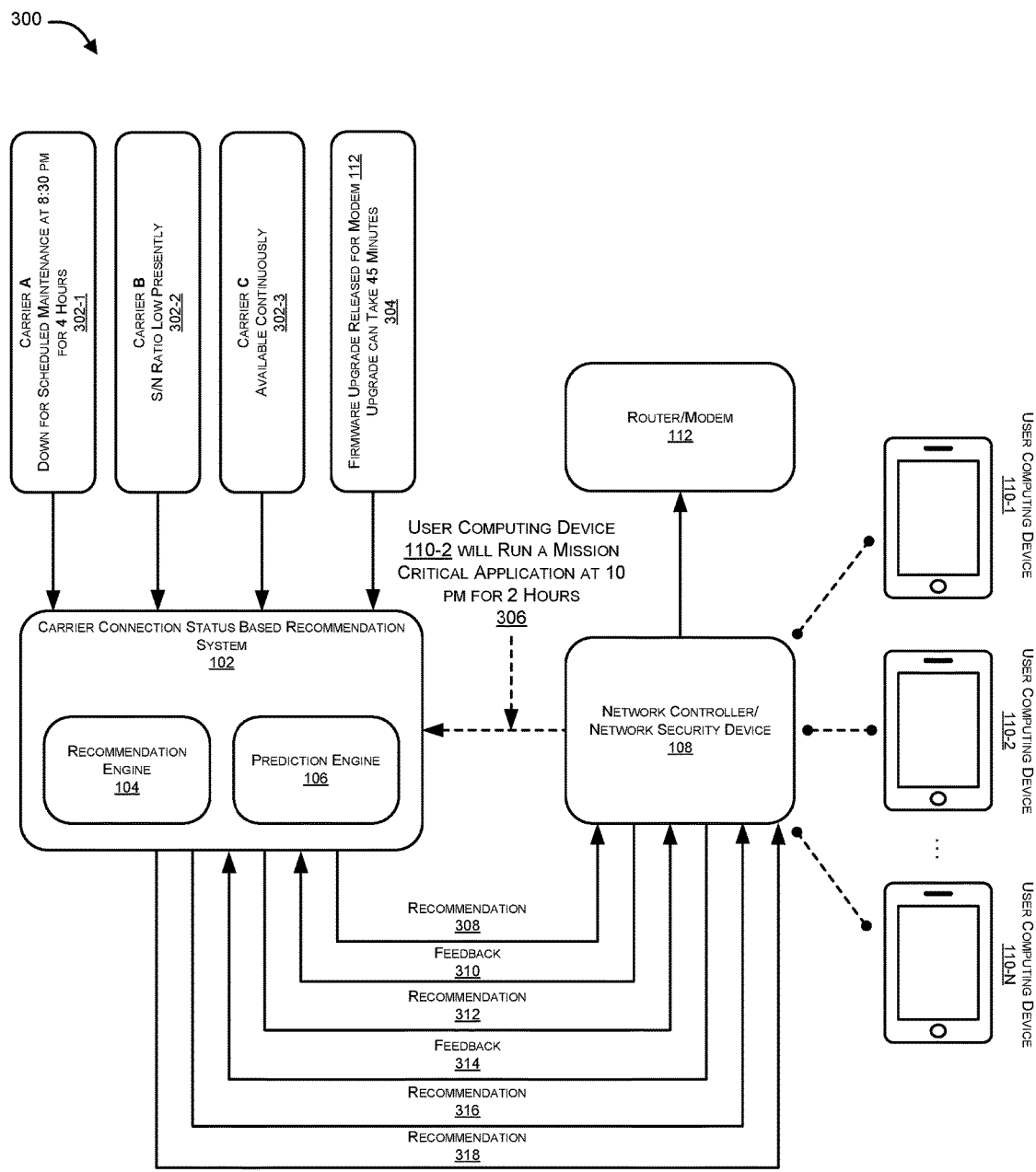
FIG. 3 illustrates an exemplary representation of working of the carrier connection status based recommendation system in accordance with an embodiment of the present invention.

FIG. 3 illustrates an exemplary representation 300 of working of the carrier connection status based recommendation system in accordance with an embodiment of the present invention. In the context of the present example, three carriers may be available at a given time to a network via router/modem 112 and network controller 108. Carrier A may have reasonably good connection parameters but those of carrier B presently may indicate low signal to noise ratio. Carrier C may use LTE technology and may be the most reliable but data transmission using same may be expensive.

At a time instant (for instance at 7 PM today), system 102 may receive different datasets as shown. One dataset 302-1, based upon an announcement at carrier A's website further processed by system 102 using natural language processing, can indicate that carrier A is down for scheduled maintenance beginning at 8:30 PM for 4 hours. Another dataset 302-2 can indicate that carrier B has currently exhibits a low signal to noise ratio, but is predicted to increase after a firmware upgrade of modem 112, while dataset 302-3 can indicate that carrier C is available continuously. Another dataset 304 can indicate that a firmware upgrade has been released for modem 112 and that the upgrade will take 45 minutes. Likewise, system 102 can receive dataset 306 from network controller 108 indicating that user computing device 110-2 is scheduled to run a mission critical application at 10 PM for two hours.

System 102 can take all these inputs and can process the data using machine learning and predictive analysis to make appropriate recommendations to prevent carrier connection degradation as appropriate. For example, particularly during a mission critical application's execution, carrier connection must be of high quality. A predictive analysis can reveal that after firmware upgrade of modem 112, signal to noise ratio of carrier B can rise to acceptable levels, but yet may not be good enough for a mission critical application to be run.

Accordingly, system 102 can generate a first recommendation 308 to upgrade firmware immediately. Network controller 108 can receive this recommendation and accordingly modem 112 can upgrade its firmware using the presently operational carrier, that is, carrier A.

Thereafter, controller 108 can give feedback 310 to system 102 that firmware of modem 112 has been upgraded. Based upon such feedback and predictive analysis already done as elaborated above, system 102 can issue recommendation 312 to switch to carrier B at 8:30 PM. Accordingly, at 8:30 PM, network controller 108 can enable modem 112 to switch to carrier B. After such switching, network controller 108 can give feedback 314 to system 102 indicating actual signal noise ration achieved in carrier B after firmware upgrade, to enable system 102 to make better predictions in the future.

Should the new signal to noise ratio exhibited by carrier B allow mission critical application of user computing device 110-2 to be run, system 102 can recommend that modem 112 remains connected to carrier B. If not, as indicated at recommendation 316, system 102 can recommend that modem 112 be switched to reliable (but expensive) carrier C at 10 PM, and switch back to carrier B at 00:00. Thereafter, at 00:00 or a pre-determined time earlier, system 102 can issue a recommendation 318 that modem 112 switch to carrier A at 00:30 AM (since at that time carrier A will be up again, as per its scheduled maintenance downtime).

In an aspect, all recommendations and associated data can be stored at system 102 (or network controller 108, or even at user computing device 110-2) for future retrieval and usage as necessary by system 102.

As can be seen, in this manner the proposed system can receive different datasets and use machine learning, natural language processing and predictive learning on such datasets to generate various recommendations suitable to present or emergent situation.

FIG. 4 illustrates exemplary representation of a log 400 of recommendations maintained by a user computing device or a network controller in accordance with an embodiment of the present invention. In an aspect, the proposed system relies upon developing and then continuously refining a predictive model based upon machine learning to increase the accuracy of its recommendations. The predictive model can be refined based on received data, recommended actions, and feedback on change in connection status based on the recommended actions.

For this purpose, the proposed system can enable a user computing device or a network controller to maintain a log 400 of recommendations as illustrated in FIG. 4. The log 400 can contain data received 402 with a corresponding time stamp 404 and the recommendation 406 provided by the proposed system. Different situations/datasets can enable generation of different recommendations.

As illustrated, when the data received indicates that wireless carrier A is facing an outage, the generated recommendation can be to switch to wireless carrier B. When the data received indicates that there is a sporting event at XYZ stadium on 21 Feb. 2023 from 6 PM to 9:30 PM, the recommendation can be to switch to wireless carrier B during this time, and thereafter switch back to wireless career A. Likewise, if the dataset received indicates that new firmware is available for a modem connected to the network for which the proposed system has been configured, the recommendation can be to upgrade the firmware of the modem (or associated network controller, likewise), and when the data received indicates wireless carrier A is providing an internet speed of 600 KBPS, the recommendation can be to switch to wireless carrier B.

As can be readily appreciated, log 400 can serve as a historical database that can in turn be used for refining the predictive model enabled by the system of the present disclosure to increase the accuracy of its recommendations. One or more datasets can be retrieved from log 400 at any time that can clearly indicate how the system has managed to retain/improve its performance under similar conditions in the past. The log can, of course, serve to identify severe issues such as recurrent hardware failure that can in turn be used for taking appropriate corrective actions such as, for example, replacing the defective hardware.

FIGS. 5A-F illustrate examples for generating recommendations for actions to be taken to prevent connection degradation in accordance with an embodiment of the present invention.

Figure 5A:
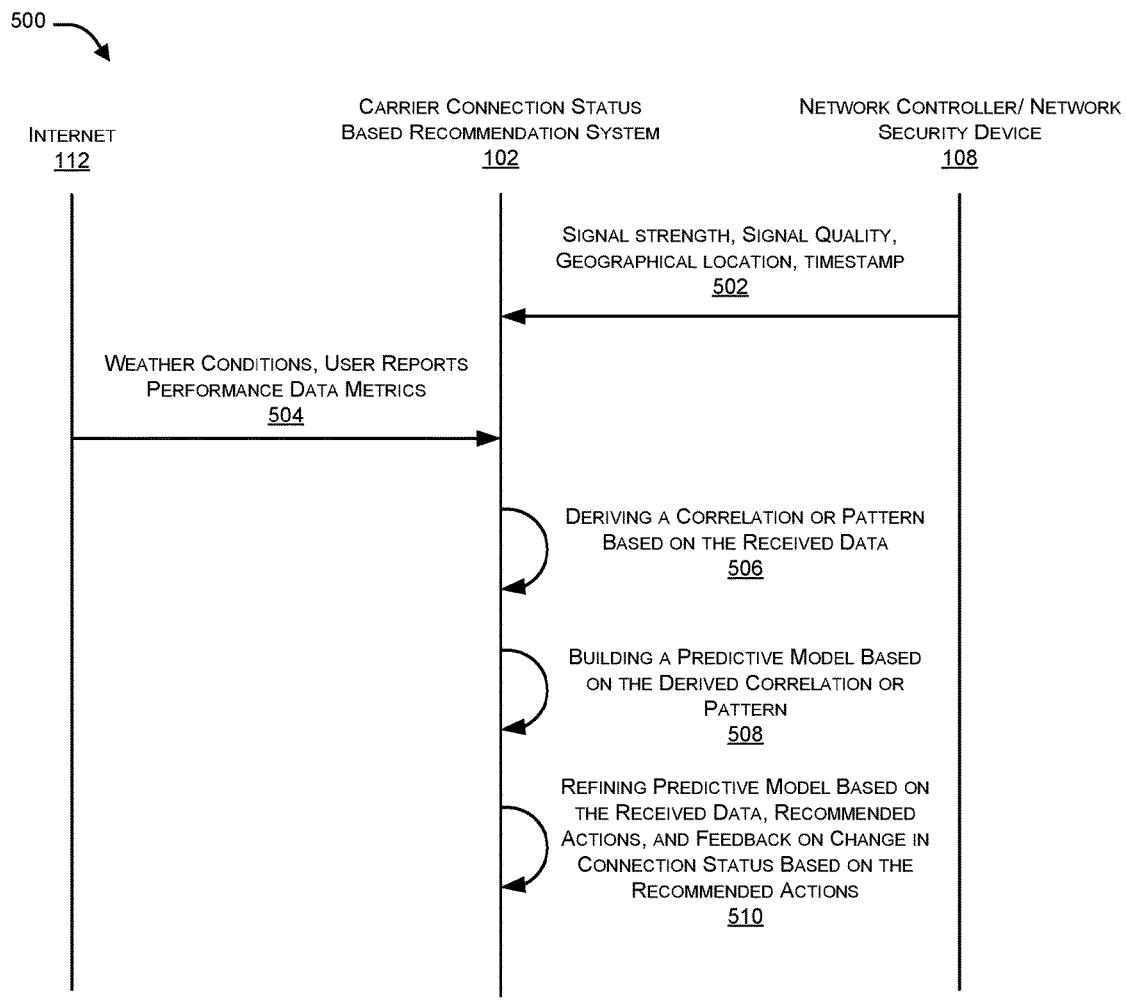
FIGS. 5A-F illustrate examples for generating recommendations for actions to be taken to prevent connection degradation in accordance with an embodiment of the present invention.

FIG. 5A illustrates how carrier connection status based recommendation system 102 can use various signal and performance related datasets via machine learning to build a predictive model and further refine it in accordance with an exemplary embodiment of the present disclosure.

As illustrated, system 102 can receive from Internet 112 various datasets such as weather conditions, user reports and performance data metrics as illustrated at 504. Likewise, system 102 can receive from network controller/network security device 108 parameters pertaining to the network's performance based upon signal strength and quality (of the existing carrier), geographical location and timestamp as shown at 502. A variety of such datasets can be received and timestamps therein can assist in connection with historical analysis, pattern development and the like.

Based upon such datasets received, system 102 can derive a correlation or pattern, as shown at 506, and based upon the derived correlation or pattern can build a predictive model as shown at 508. This predictive model can be continuously refined based on received data (data may be received in continuous streams or as snapshots taken at regular/random intervals), recommended actions and feedback on change in connection status (such as improvement/degradation in overall network performance) based on recommended actions, as shown at 510.

Figure 5B:
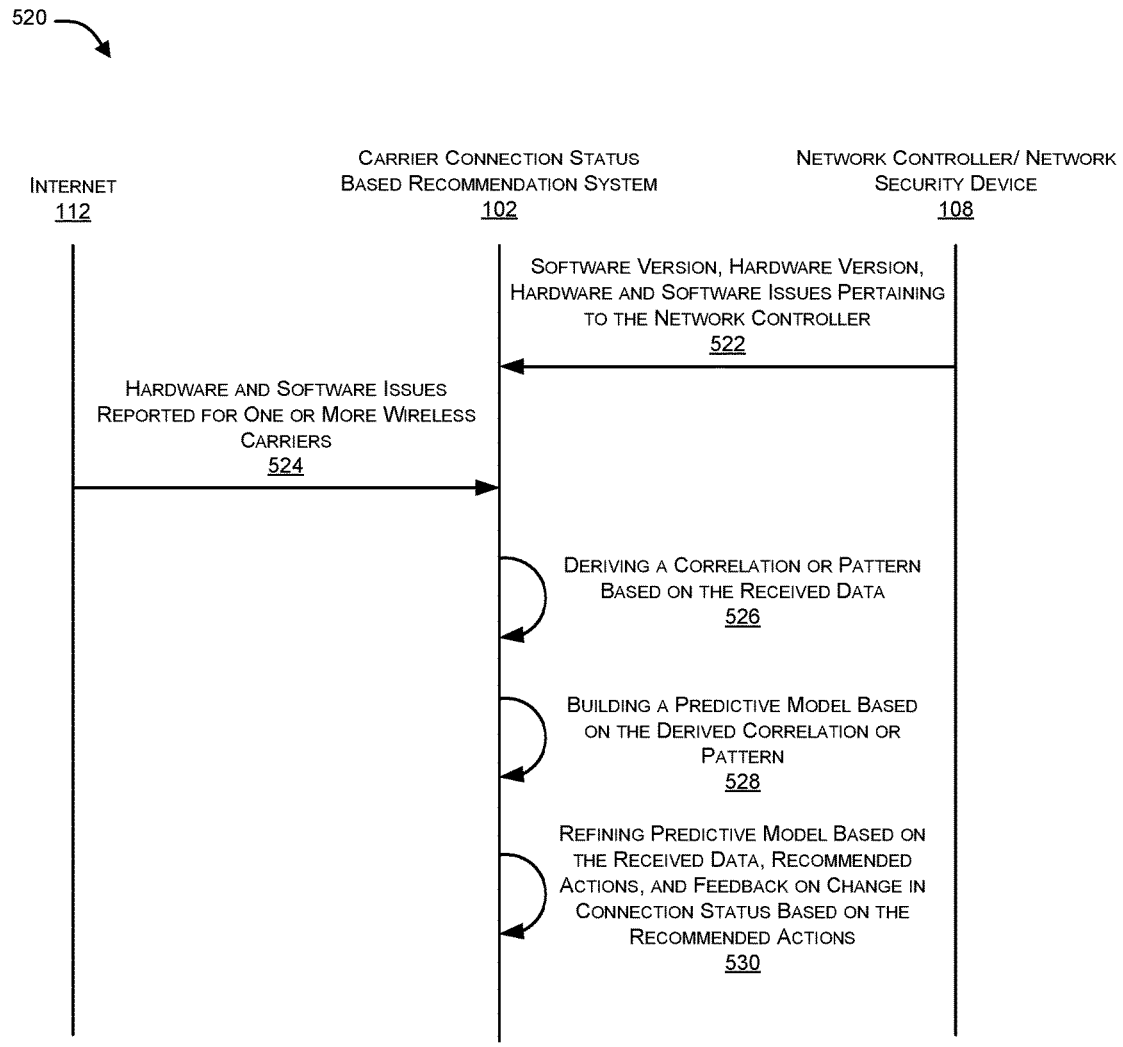

FIG. 5B illustrates how carrier connection status based recommendation system 102 can use reported issue datasets via machine learning to build a predictive model and further refine it in accordance with an exemplary embodiment of the present disclosure.

As illustrated, system 102 can receive from Internet 112 hardware and software issues reported for one or more wireless carriers as shown at 524. These issue can include, for instance, datasets for bug reports related to software versions, software release notes of known issues, new software release notes, customer reports etc. pertaining to the one or more wireless carriers. System 102 can as well receive from network controller/network security device 108 datasets pertaining to software/hardware versions of different components within, and hardware/software issues pertaining to the network, as shown at 522. These issues can also encompass connectivity issues, reboots, service disruptions etc.

Based upon such datasets received, system 102 can derive a correlation or pattern, as shown at 526, and based upon the derived correlation or pattern can build a predictive model as shown at 528. This predictive model can be continuously refined based on received data (data may be received in continuous streams or as snapshots taken at regular/random intervals), recommended actions and feedback on change in connection status based on recommended actions, as shown at 530.

Figure 5C:
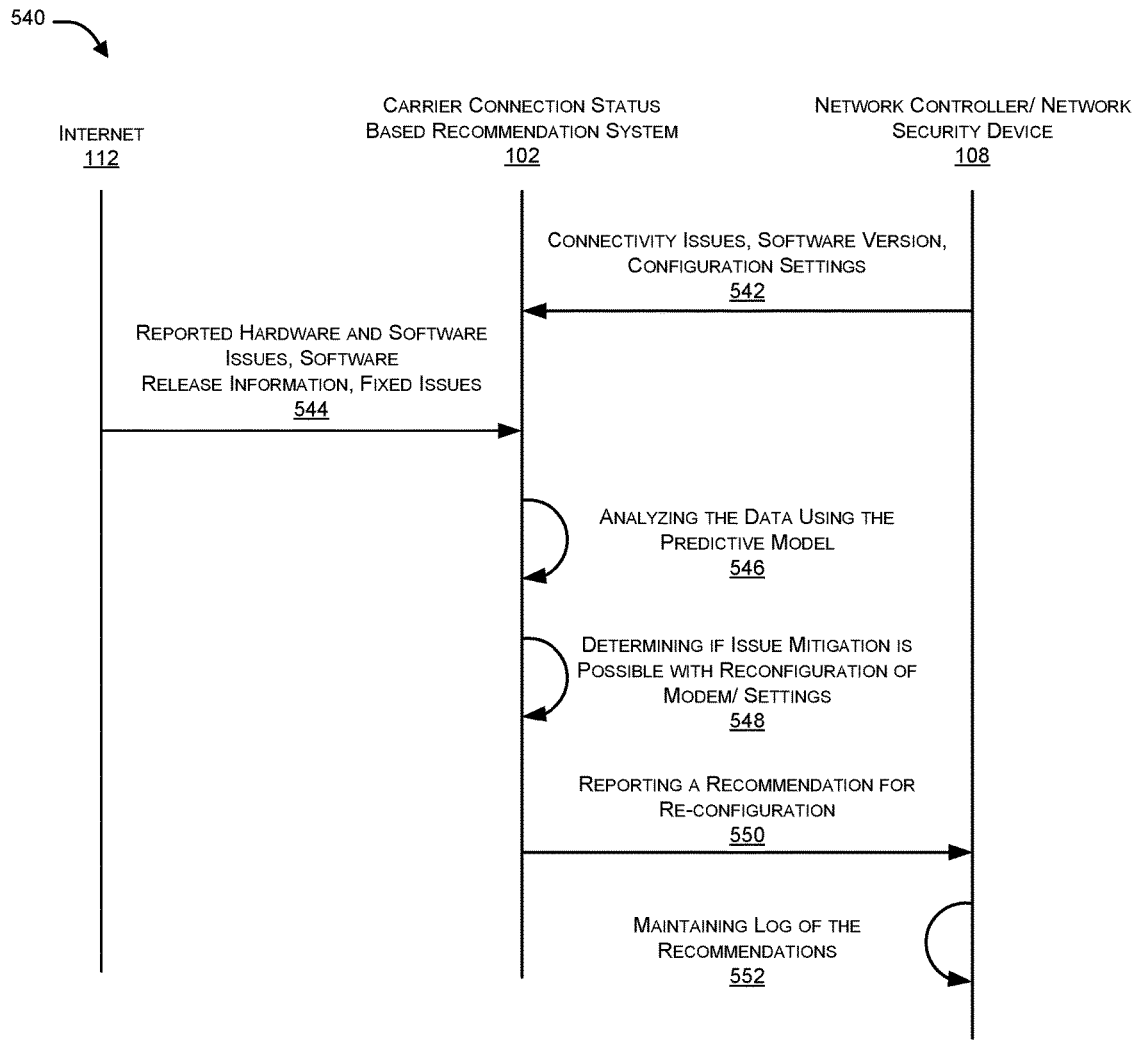

FIG. 5C illustrates how carrier connection status based recommendation system 102 (system of the present disclosure) can recover a network controller from known issues in accordance with an exemplary embodiment of the present disclosure.

As illustrated, system 102 can receive from Internet 112 reported hardware and software issues, software release information, fixed issues etc. pertaining to one or more wireless carriers as shown at 544. Further, system 102 can receive from network controller/network security device 108 datasets pertaining to connectivity issues, software version, configuration settings etc. of the network, as shown at 542.

Based upon received datasets, system 102 can analyze the data using the predictive model (such as one established as elaborated via FIG. 5A or FIG. 5B) as illustrated at 546, and can accordingly determine if issue mitigation is possible with reconfiguration of the network controller and/or associated devices such as modem and/or settings thereupon, as shown at 548. If so, system 102 can report to network controller 108 a recommendation for reconfiguration as shown at 550. Thereafter, system 102 can enable network controller 108 to maintain a log of the recommendations as shown at 552. The network administrator can be alerted regarding a recovery process if any to be applied, and, if auto-recovery is enabled, recommended software patches for auto-recovery can be downloaded and stored. In an alternate exemplary embodiment, all such logs can be maintained at the system 102 as well.

Figure 5D:
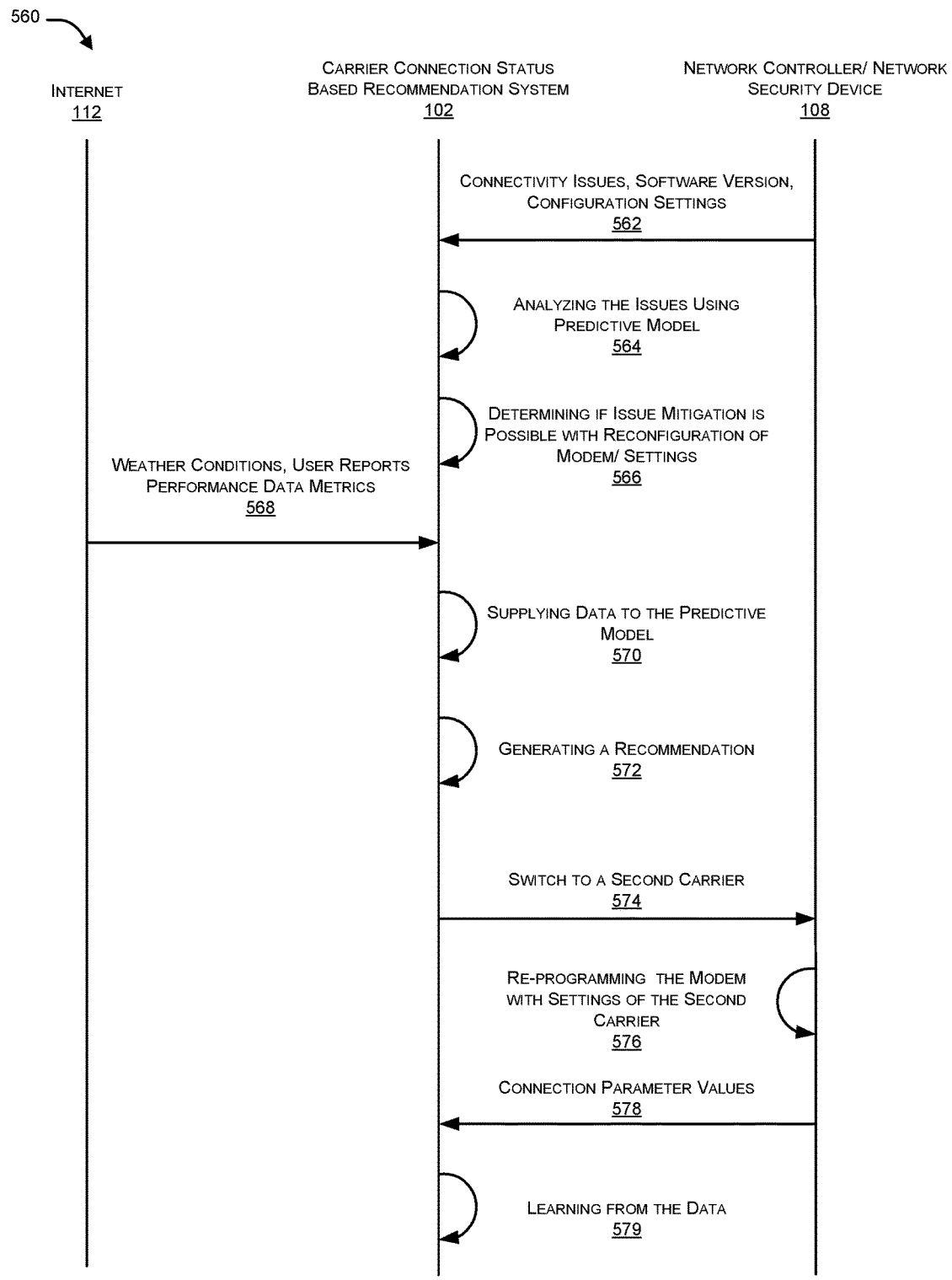

FIG. 5D illustrates how carrier connection status based recommendation system 102 (system of the present disclosure) can enable a network controller/network security device switch carriers in accordance with an exemplary embodiment of the present disclosure.

As illustrated, system 102 can receive from network controller 108 datasets pertaining to the network such as connectivity issues, software version, configuration settings etc. as illustrated at 562. Based upon received datasets, system 102 can analyze the data using the predictive model (such as one established as elaborated via FIG. 5A or FIG. 5B) as illustrated at 564, and can accordingly determine if issue mitigation is possible with reconfiguration of the network controller and/or associated devices such as modem and/or settings thereupon, as shown at 566. If yes, proposed system can proceed with further steps as elaborated in FIG. 5C (steps 550 and 552).

However, if issue mitigation is not possible with such internal reconfiguration, system 102 can then proceed to pulling/receiving from Internet 112 various datasets pertaining to weather conditions, user reports, performance data metrics etc. as illustrated at 568. This can include pulling reports from Internet feeds of available carriers and their quality for a GPS location, for instance. System 102 can provide all this new input to the predictive model setup (as earlier elaborated), as shown at 570. It can be appreciated that the predictive model can already have previous historical date sets.

Based upon various datasets as above and machine learning algorithms, the predictive model enabled by system 102 can generate a recommendation, as shown at 572. The recommendation can either advise an alternate carrier to switch to, or can even recommend staying on the present carrier. Such recommendation can be passed on to the network controller 108 and can be to switch to a second carrier, as illustrated at 574. Further, the recommendation can include data regarding appropriate settings to be configured by device 108. Device 108 can accordingly reprogram itself/associated devices. For instance, as shown at 576, device 108 can reprogram associated modem with settings of the second carrier. Connection parameter values thus achieved (for example, better Internet quality, speed and the like) can be passed to the system 102 as feedback, as shown at 578. System 102 can further learn from the data received, as shown at 579, thereby continuously fine tuning itself using machine learning for enhancing accuracy of further recommendations.

Figure 5E:
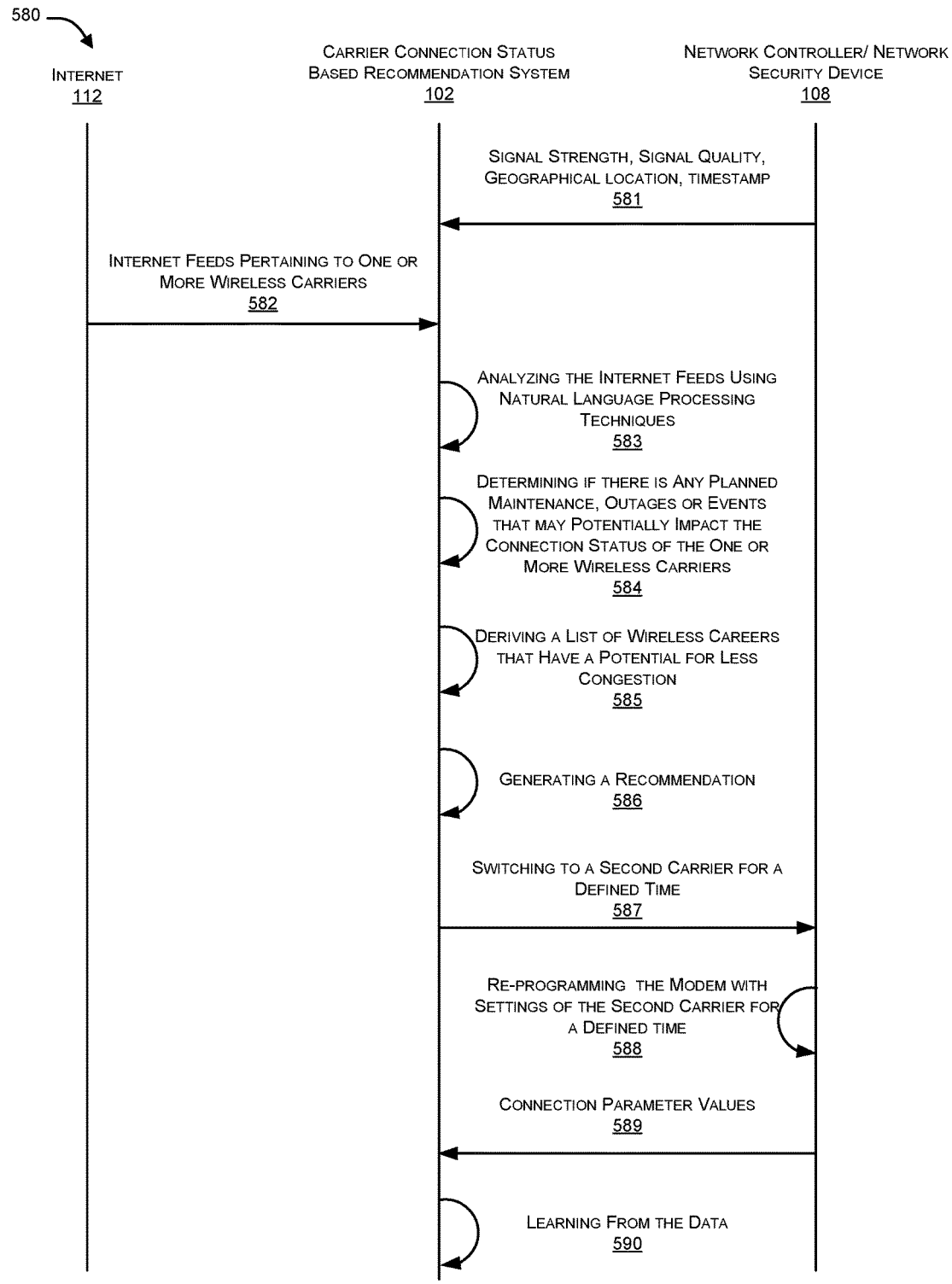

FIG. 5E illustrates how carrier connection status based recommendation system 102 (system of the present disclosure) can enable prevention of future network outages, in accordance with an exemplary embodiment of the present disclosure.

As illustrated, system 102 can receive from network security device 108 signal strength, signal quality, geographical location and time stamp pertaining to the network, as illustrated at 581 and Internet feeds pertaining to one or more wireless carriers, as shown at 582. The Internet feeds can be analyzed using natural language processing techniques, as shown at 583, and can accordingly determine if there is any planned maintenance, outage or events that may potentially impact connection status of the one or more wireless carriers, as shown at 584. For instance, system 102 can determine from different carriers'/ISP's websites if there is a planned maintenance or potential outages and likewise from websites of different events (or an event aggregator website/portal, for instance)) whether there is any major events like victory parades, graduation ceremonies, etc involving large gatherings of people that may have the potential to disrupt/deteriorate/congest the carrier presently being used.

Accordingly, system 102 of the present disclosure can derive a list of wireless carriers that have a potential for less congestion, as shown at 585 and can accordingly generate a recommendation shown at 586. The recommendation can be, for instance, in form of a planned outage message indicating date, time and duration the present carrier may be affected and recommending another ISP/carrier for that period, and can also include data regarding appropriate settings to be configured by controller 108

As illustrated at 587, at/before time indicated in the recommendation, system 102 can enable network controller 108 to switch to a second carrier for a defined time, and at 588, controller 108 can reprogram its associated modem with the firmware settings of the second carrier/ISP (in order to use the second carrier/ISP) for the defined time as provided in the recommendation. In this manner, proposed system can maintain continuity of service and overcome the data service deterioration expected.

Further, as illustrated at 589, connection parameter values thus achieved (for example, better Internet quality, speed and the like) can be passed to the system 102 as shown at 589. System 102 can further learn from the data received, as shown at 590, thereby continuously fine tuning itself using machine learning for enhancing accuracy of further recommendations.

Figure 5F:
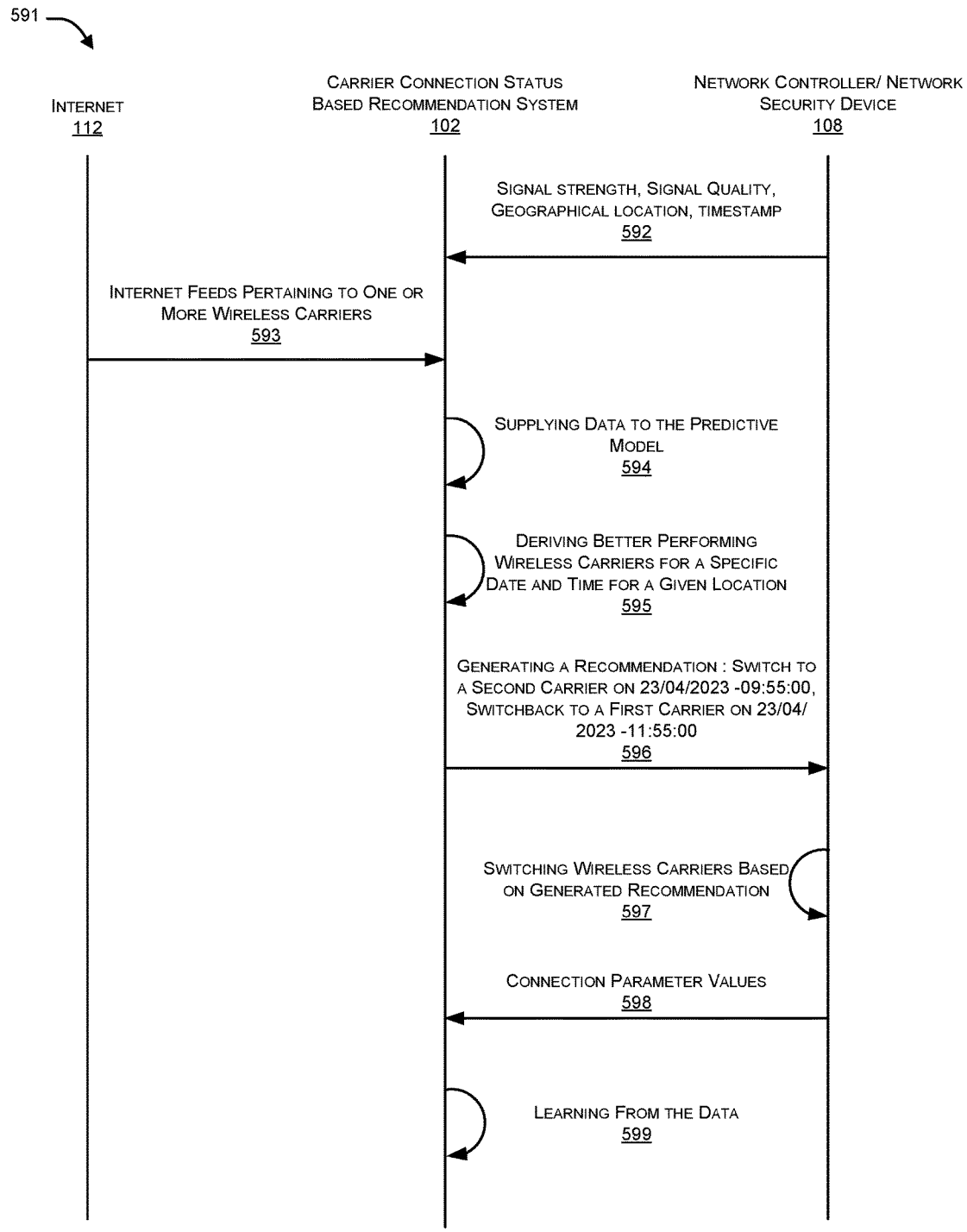

FIG. 5F illustrates how carrier connection status based recommendation system 102 (system of the present disclosure) can enable a network experience best quality based on time of day, in accordance with an exemplary embodiment of the present disclosure.

As illustrated, system 102 can receive from network security device 108 signal strength, signal quality, geographical location and time stamp pertaining to the network, as illustrated at 592 and Internet feeds pertaining to one or more wireless carriers, as shown at 593.

Thereafter, as illustrated at 594, system 102 can provide received datasets to the predictive model (established as elaborated above). The data can be analyzed, for instance, on quality of internet that can be achieved based on historical data, timestamps, carrier congestion, etc. Accordingly, as shown at 595, system 102 can derive better performing wireless carriers for a specific date and time for a given location and can generate a recommendation for network controller 108 accordingly. In an exemplary embodiment as illustrated at 596, the recommendation can be to switch to a second carrier on 23 Apr. 2023 at 9:55, and switchback to a first carrier on 24 Apr. 2023 at 11:55.

As illustrated at 597, network controller 108 can switch wireless carriers based on the generated recommendation. At each switch, associated modem settings can also be reconfigured as already elaborated.

Further, as illustrated at 598, connection parameter values thus achieved (for example, better Internet quality, speed and the like) can be passed to the system 102 as shown at 598. System 102 can further learn from the data received, as shown at 599, thereby continuously fine tuning itself using machine learning for enhancing accuracy of further recommendations.

Figure 6:
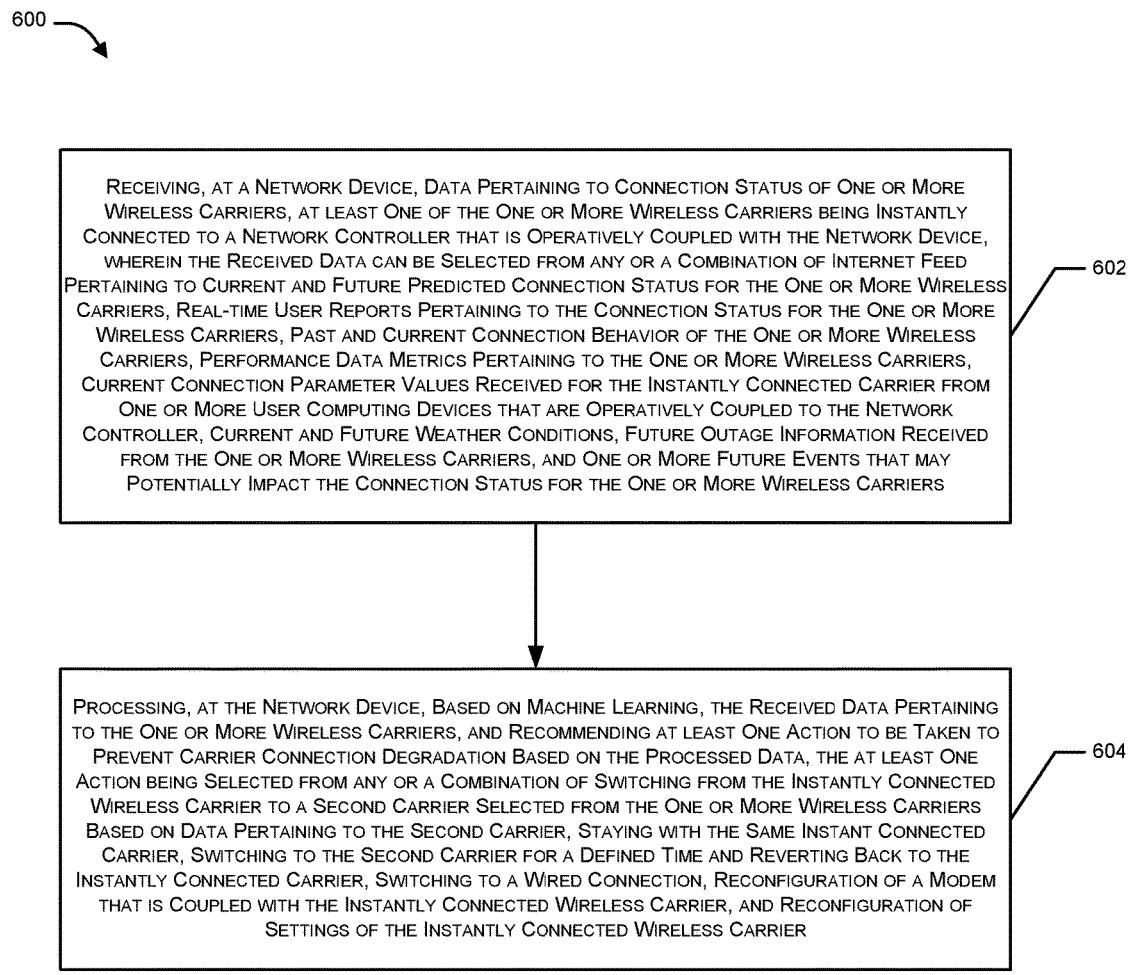
FIG. 6 is a flow diagram illustrating a method for recommending at least one action to be taken based on current and predicted connection status of one or more wireless carriers in accordance with an embodiment of the present invention.

FIG. 6 is a flow diagram illustrating a method for recommending at least one action to be taken based on current and predicted connection status of one or more wireless carriers in accordance with an embodiment of the present invention.

In an aspect the method can include, at step 602, receiving, at a network device, data pertaining to connection status of one or more wireless carriers, at least one of the one or more wireless carriers being instantly connected to a network controller that is operatively coupled with the network device, wherein the received data can be selected from any or a combination of Internet feed pertaining to current and future predicted connection status for the one or more wireless carriers, real-time user reports pertaining to the connection status for the one or more wireless carriers, past and current connection behavior of the one or more wireless carriers, performance data metrics pertaining to the one or more wireless carriers, current connection parameter values received for the instantly connected carrier from one or more user computing devices that are operatively coupled to the network controller, current and future weather conditions, future outage information received from the one or more wireless carriers, and one or more future events that may potentially impact the connection status for the one or more wireless carriers.

The method can further include, at step 604, processing, at the network device, based on machine learning, the received data pertaining to the one or more wireless carriers, and recommending at least one action to be taken to prevent carrier connection degradation based on the processed data, the at least one action being selected from any or a combination of switching from the instantly connected wireless carrier to a second carrier selected from the one or more wireless carriers based on data pertaining to the second carrier, staying with the same instant connected carrier, switching to the second carrier for a defined time and reverting back to the instantly connected carrier, switching to a wired connection, reconfiguration of a modem that is coupled with the instantly connected wireless carrier, and reconfiguration of settings of the instantly connected wireless carrier.

Figure 7:
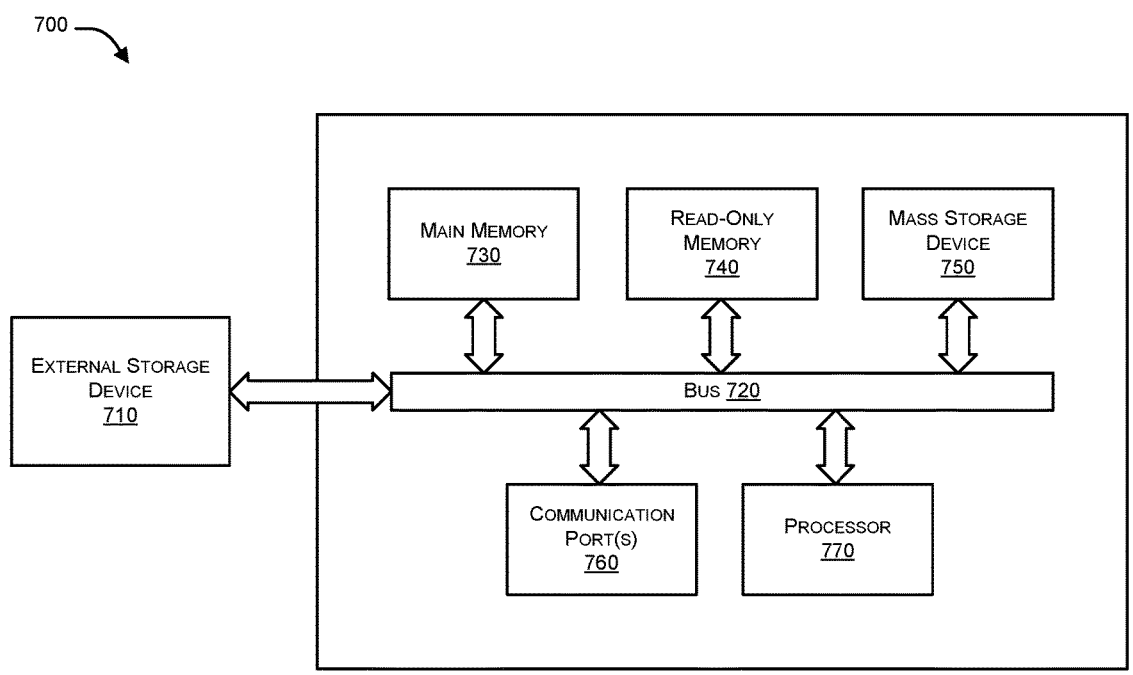
FIG. 7 illustrates an exemplary computer system in which or with which embodiments of the present invention can be utilized in accordance with embodiments of the present disclosure.

FIG. 7 illustrates an exemplary computer system in which or with which embodiments of the present invention can be utilized in accordance with embodiments of the present disclosure. Computer system 700 may represent all or a portion of a carrier connection status based recommendation system (e.g., carrier connection status based recommendation system 102), a network controller/network security device (e.g., network controller/network security device 108) and/or a router/modem (e.g., router/modem 112).

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As shown in the figure, computer system 700 includes an external storage device 710, a bus 720, a main memory 730, a read only memory 740, a mass storage device 750, communication port 760, and a processor 770. A person skilled in the art will appreciate that computer system 700 may include more than one processor and communication ports. Examples of processor 770 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 770 may include various modules associated with embodiments of the present invention. Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system 700 connects. Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g., start-up or BIOS instructions for processor 770. SANs and VSANs may also be deployed. Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc. Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system. Optionally, operator and administrative interfaces, e.g. a display, keyboard, and a cursor control device, may also be coupled to bus 720 to support direct operator interaction with computer system 700. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:

receiving, by a recommendation computer system that provides recommendations regarding mitigation actions to be undertaken by a network security device associated with a private network, from an external network a first set of data pertaining to one or more wireless carriers, wherein a modem of the private network is configured to provide connectivity to the external network on behalf of the private network via a first wireless carrier of a plurality of wireless carriers, and wherein the first set of data is selected from one or more of an Internet feed pertaining to current and future predicted connection status for each of the plurality of wireless carriers, real-time user reports pertaining to their respective connection status with the plurality of wireless carriers, past and current connection behavior of the plurality of wireless carriers, current and future weather conditions, future outage information received from the plurality of wireless carriers, performance data metrics pertaining to the plurality of wireless carriers, and one or more future events that may potentially impact the current and future predicted connection status;

receiving, by the recommendation computer system, from the network security device a second set of data including one or more of, current connection parameter values associated with the first wireless carrier as observed by one or more user computing devices that are operatively coupled to the network security device, reported hardware/software issues pertaining to the network security device and configuration information associated with the network security device and the modem, wherein the configuration information includes one or more of a software version, a hardware version, and configuration settings of the network security device and the modem;

based on machine learning processing of the received first set of data and the received second set of data, predicting, by the recommendation computer system, an interruption of the connectivity to the external network at a point in time in the future;

determining, by the recommendation computer system, whether the predicted interruption can be mitigated by performing a reconfiguration of the network security device or the modem;

when said determining is affirmative, then issuing, by the recommendation computer system, a first recommendation to the network security device to perform the reconfiguration, wherein the recommended reconfiguration includes one or more of updating firmware, updating software, installing a software patch and revising configuration settings of the network security device or the modem; and when said determining is negative, then issuing, by the recommendation computer system, a second recommendation to the network security device to switch from the first wireless carrier to a second wireless carrier of the plurality of wireless carriers, wherein the second recommendation is based on processing of data pertaining to the second wireless carrier within the first set of data by machine learning.

2. The method of claim 1, wherein the current connection parameter values comprise one or more of signal strength, signal quality, and geographical locations of the one or more user computing devices.

3. The method of claim 1, further comprising receiving data pertaining to one or more of hardware issues reported for the plurality of wireless carriers, and software issues reported for the plurality of wireless carriers.

4. The method of claim 1, wherein said predicting, by the recommendation computer system, an interruption further comprises creating or updating a predictive model by deriving a correlation or pattern based on the received first set of data and the received second set of data.

5. The method of claim 4, further comprising refining, by the recommendation computer system, the predictive model based on the received first set of data, the received second set of data, the first recommendation or the second recommendation, and feedback regarding a change in said predicting after the first recommendation or the second recommendation have been performed.

6. The method of claim 1, wherein said switch from the first wireless carrier to a second wireless carrier of the plurality of wireless carriers is performed by activation of a data connection of a subscriber identification module (SIM) card of the modem pertaining to the second wireless carrier.

7. The method of claim 1, wherein the one or more future events comprises a large gathering of people that is expected to result in increased data congestion associated with the first wireless carrier as a result of a substantial increase in mobile device usage.

8. A non-transitory computer-readable storage medium embodying a set of instructions, which when executed by one or more processors of a recommendation computer system that provides recommendations regarding mitigation actions to be undertaken by a network security device associated with a private network, causes the one or more processors to perform a method comprising:
receiving from an external network a first set of data pertaining to one or more wireless carriers, wherein a modem of the private network is configured to provide connectivity to the external network on behalf of the private network via a first wireless carrier of a plurality of wireless carriers, and wherein the first set of data is selected from one or more of an Internet feed pertaining to current and future predicted connection status for each of the plurality of wireless carriers, real-time user reports pertaining to their respective connection status with the plurality of wireless carriers, past and current connection behavior of the plurality of wireless carriers, current and future weather conditions, future outage information received from the plurality of wireless carriers, performance data metrics pertaining to the plurality of wireless carriers, and one or more future events that may potentially impact the current and future predicted connection status;
receiving from the network security device a second set of data including one or more of, current connection parameter values associated with the first wireless carrier as observed by one or more user computing devices that are operatively coupled to the network security device, reported hardware/software issues pertaining to the network security device and configuration information associated with the network security device and the modem, wherein the configuration information includes one or more of a software version, a hardware version, and configuration settings of the network security device and the modem;
based on machine learning processing of the received first set of data and the received second set of data, predicting an interruption of the connectivity to the external network at a point in time in the future;
determining whether the predicted interruption can be mitigated by performing a reconfiguration of the network security device or the modem;
when said determining is affirmative, then issuing a first recommendation to the network security device to perform the reconfiguration, wherein the recommended reconfiguration includes one or more of updating firmware, updating software, installing a software patch and revising configuration settings of the network security device or the modem; and
when said determining is negative, then issuing a second recommendation to the network security device to switch from the first wireless carrier to a second wireless carrier of the plurality of wireless carriers, wherein the second recommendation is based on processing of data pertaining to the second wireless carrier within the first set of data by machine learning.

9. The non-transitory computer-readable storage medium of claim 8, wherein the current connection parameter values comprise one or more of signal strength, signal quality, and geographical locations of the one or more user computing devices.

10. The non-transitory computer-readable storage medium of claim 8, wherein the method further comprises receiving data pertaining to one or more of hardware issues reported for the plurality of wireless carriers, and software issues reported for the plurality of wireless carriers.

11. The non-transitory computer-readable storage medium of claim 8, wherein said predicting an interruption further comprises creating or updating a predictive model by deriving a correlation or pattern based on the received first set of data and the received second set of data.

12. The non-transitory computer-readable storage medium of claim 11, wherein the method further comprises refining the predictive model based on the received first set of data, the received second set of data, the first recommendation or the second recommendation, and feedback regarding a change in said predicting after the first recommendation or the second recommendation have been performed.

13. The non-transitory computer-readable storage medium of claim 8, wherein said switch from the first wireless carrier to a second wireless carrier of the plurality of wireless carriers is performed by activation of a data connection of a subscriber identification module (SIM) card of the modem pertaining to the second wireless carrier.

14. The non-transitory computer-readable storage medium of claim 8, wherein the one or more future events comprises a large gathering of people that is expected to result in increased data congestion associated with the first wireless carrier as a result of a substantial increase in mobile device usage.

* * * * *